US012340605B2

United States Patent
Alabi et al.

(10) Patent No.: US 12,340,605 B2
(45) Date of Patent: Jun. 24, 2025

(54) OPTICAL CHARACTER RECOGNITION SYSTEM WITH BACK PROPAGATION OF AN OBJECTIVE LOSS FUNCTION

(71) Applicant: DocuSign, Inc., San Francisco, CA (US)

(72) Inventors: Taiwo Raphael Alabi, Berkeley, CA (US); Farzaneh Rajabi, Redwood City, CA (US); Ashwath Saran Mohan, San Ramon, CA (US); Devin Cabillo, Fairfield, CA (US); Jerome Levadoux, San Mateo, CA (US); Nipun Dureja, Seattle, WA (US)

(73) Assignee: Docusign, Inc., San Francisco, CA (US)

(*) Notice: Subject to any disclaimer, the term of this patent is extended or adjusted under 35 U.S.C. 154(b) by 420 days.

(21) Appl. No.: 17/874,688

(22) Filed: Jul. 27, 2022

(65) Prior Publication Data

US 2024/0037970 A1   Feb. 1, 2024

(51) Int. Cl.
*G06V 30/164* (2022.01)
*G06F 16/93* (2019.01)
*G06V 30/148* (2022.01)

(52) U.S. Cl.
CPC ............ *G06V 30/164* (2022.01); *G06F 16/93* (2019.01); *G06V 30/153* (2022.01)

(58) Field of Classification Search
CPC .... G06V 30/164; G06V 30/153; G06V 30/41; G06V 10/774; G06V 10/82; G06T 5/70; G06T 5/50; G06T 5/60; G06T 2207/20182; G06T 2207/20081; G06T 2207/20084; G06N 3/084; G06N 3/0464
See application file for complete search history.

(56) References Cited

U.S. PATENT DOCUMENTS

| | | | |
|---|---|---|---|
| 9,634,875 B2 | 4/2017 | Porat | |
| 10,430,570 B2 | 10/2019 | Gonser et al. | |
| 11,663,840 B2* | 5/2023 | Kabaria | G06V 30/19173 382/112 |
| 2020/0387750 A1* | 12/2020 | Shcherbinin | G06T 5/73 |
| 2021/0374395 A1* | 12/2021 | Tata | G06V 30/413 |
| 2022/0035993 A1* | 2/2022 | Bhandarkar | G06F 40/284 |
| 2022/0180114 A1* | 6/2022 | Achiwa | G06N 20/00 |

(Continued)

*Primary Examiner* — Sumati Lefkowitz
*Assistant Examiner* — Anna Lei
(74) *Attorney, Agent, or Firm* — Shumaker & Sieffert, P.A.

(57) ABSTRACT

A document management system performs optical character recognition (OCR) on a high resolution version of an image of a document, obtaining a first set of text representative of the text of the document. The document management system applies a machine-learned model on a low-resolution version of the image of the document, producing a denoised image that is of a higher resolution than that input into the machine-learned model. The document management system performs OCR on the denoised image, obtaining a second set of text representative of the text of the document. The document management system compares the first and second sets of text in the form of an objective loss function. The document management system subsequently generates a feature vector from the comparison of the sets of text and retrains the machine-learned model with the generated feature vector.

20 Claims, 5 Drawing Sheets

(56) References Cited

U.S. PATENT DOCUMENTS

2022/0366179 A1* 11/2022 Zagaynov .............. G06N 3/045
2022/0398399 A1* 12/2022 Muffat ................. G06V 30/416
2022/0398694 A1* 12/2022 Krishnamoorthy .. G06V 30/414
2022/0398900 A1* 12/2022 Krishnamoorthy .. G06V 10/751

* cited by examiner

OPTICAL CHARACTER RECOGNITION SYSTEM WITH BACK PROPAGATION OF AN OBJECTIVE LOSS FUNCTION

TECHNICAL FIELD

The disclosure generally relates to the field of document management, and specifically to improving optical character recognition with back propagation of an objective loss function.

BACKGROUND

Online document management systems can be used to create and review documents and may provide users with tools to edit, view, and execute the documents. A user may import images of existing documents into the document management system. When converting the imported images to text, conventional techniques often result in image artifacts or other effects that reduce the quality of the document. There is a need to improve the efficiency and accuracy of processing techniques for images of documents.

SUMMARY

A method to help improve optical character recognition processes within a document management system is disclosed herein.

A document management system accesses an image of a document comprising text. The document management system processes the accessed image to produce a first and second image version. The first image version has a higher resolution than the second image version. The document management system performs optical character recognition (OCR) on the first image version, obtaining a first set of text representative of the text of the document. The document management system applies a machine-learned model to the second image version to produce a denoised image of the document. The denoised image has a higher resolution than the second image version. The document management system performs OCR on the denoised image, resulting in a second set of text representative of the text of the document. The document management system generates a feature vector that represents the efficacy and performance of the machine-learned model. At least one of the entries in the feature vector is based on a comparison of the first and second sets of text, and the machine-learned model is retrained using the feature vector.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a high-level block diagram of a system environment for a document management system, in accordance with an example embodiment.

DETAILED DESCRIPTION

Figure 1:
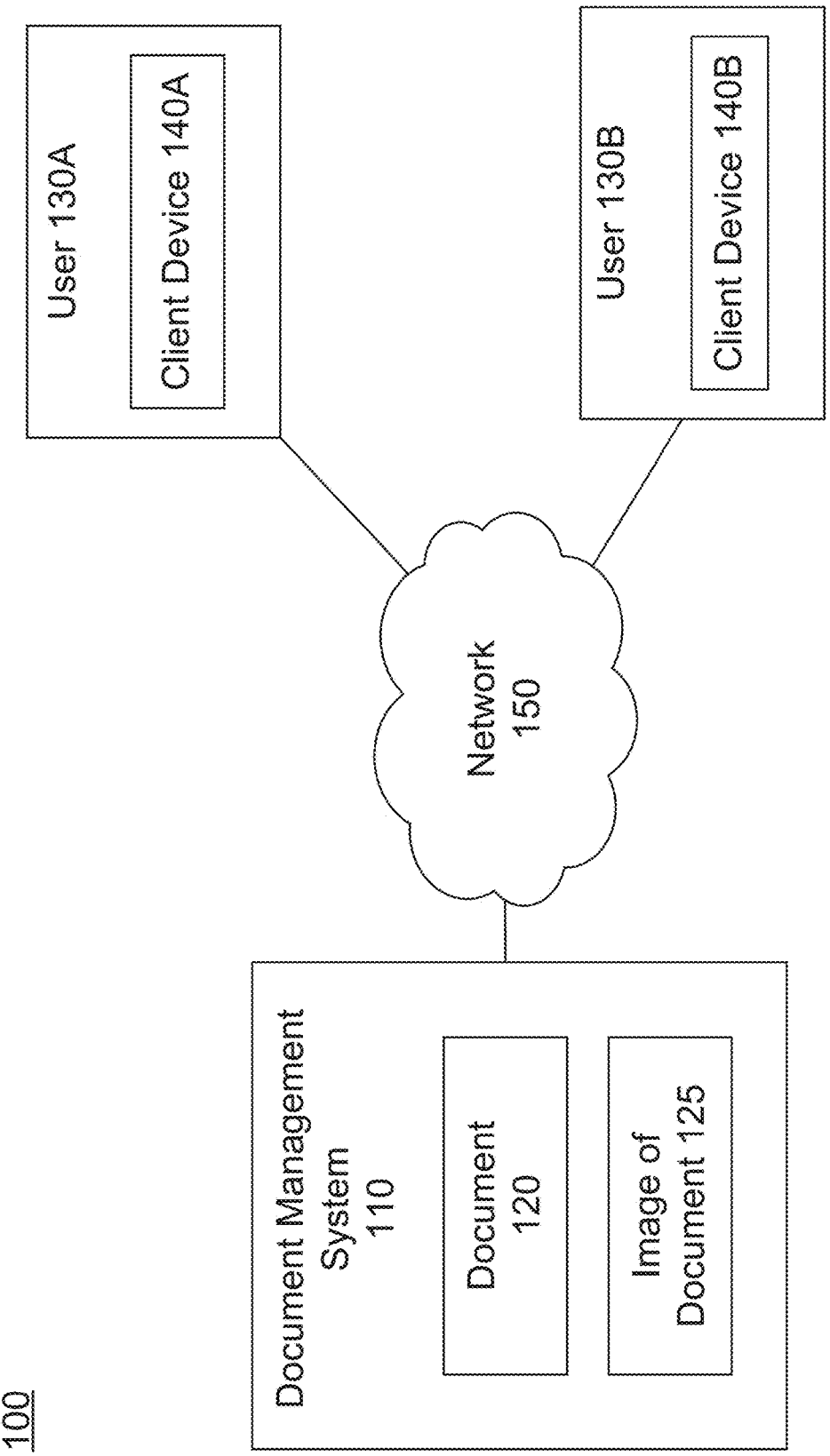

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. A letter after a reference numeral, such as "120A," indicates that the text refers specifically to the element having that particular reference numeral. A reference numeral in the text without a following letter, such as "120," refers to any or all of the elements in the figures bearing that reference numeral.

The figures depict embodiments of the disclosed system (or method) for purposes of illustration only. One skilled in the art will readily recognize from the following description that alternative embodiments of the structures and methods illustrated herein may be employed without departing from the principles described herein.

Document Management System Overview

A document management system enables a party (e.g., individuals, organizations, etc.) to create and send documents to one or more receiving parties for negotiation, collaborative editing, electronic execution (e.g., via electronic signatures), contract fulfillment, archival, analysis, and more. For example, the document management system allows users of the party to create, edit, review, and negotiate document content with other users and other parties of the document management system. An example document management system is further described in U.S. Pat. No. 9,634,875, issued Apr. 25, 2017, and U.S. Pat. No. 10,430,570, issued Oct. 1, 2019, which are hereby incorporated by reference in their entireties.

The system environment described herein can be implemented within the document management system, a document execution system, or any type of digital transaction management platform. It should be noted that although description may be limited in certain contexts to a particular environment, this is for the purposes of simplicity only, and in practice the principles described herein can apply more broadly to the context of any digital transaction management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

The methods described herein improve document creation, editing, and review processes in a document management system. When importing an existing document to the document management system, a user may upload an image of the document. While optical character recognition (OCR)

processes exist to help convert the image of the document into editable text, these conventional systems often result in significant errors. Conventional OCR systems especially struggle with accurately capturing text from images of low quality (e.g., dark, low resolution, and low contrast images). The user needs to spend time identifying and correcting these errors. Without these corrections, natural language processing algorithms and other machine learning models may perform sub-optimally, potentially proliferating the errors. Accordingly, there is a need to improve the efficiency and accuracy of the document upload and review process, especially when converting images of documents to text.

The methods described herein improve OCR processes in the document management system using machine learning. Specifically, the document management system uses back propagation of an objective loss function to improve the performance of a machine-learned model. The model can be, for instance, a denoising autoencoder configured to denoise images of documents, though it should be emphasized that the techniques described herein are applicable to any image processing models and operations.

A user provides the document management system with an image of a document. The document management system uses image processing techniques to generate a high resolution and low resolution version of the image of the document. The document management system performs OCR on the high resolution image, outputting a set of text corresponding to the text of the document. The document management system applies the machine-learned model to the low resolution image of the document, outputting a denoised image of the document. The document management system performs OCR on the denoised image of the document, obtaining a second set of text. Based on a comparison of the two sets of text, the machine-learned model generates an OCR loss function that serves as a measure of the machine-learned model's performance. The OCR loss function is back propagated through the machine-learned model for retraining. Due to the back propagation of the OCR loss function, the machine-learned model improves, resulting in better denoised images of documents that can be more accurately processed with OCR.

FIG. 1 is a high-level block diagram of a system environment 100 for a document management system 110, in accordance with an example embodiment. The system environment 100 enables users 130A-B to generate documents more efficiently with the document management system 110. As illustrated in FIG. 1, the system environment 100 includes a document management system 110, which may store a document 120 and an image of the document 125, users 130A-B, and corresponding client devices 140A-B, each communicatively interconnected via a network 150. In some embodiments, the system environment 100 includes components other than those described herein. For clarity, although FIG. 1 only shows two users 130A-B and two client devices 140A-B, alternative embodiments of the system environment 100 can have any number of users and client devices. For the purposes of concision, the web servers, data centers, and other components associated with an online system environment are not shown in FIG. 1.

The document management system 110 is a computer system (or group of computer systems) for storing and managing documents for the users 130A-B. Using the document management system 110, users 130A-B can collaborate to create, edit, review, store, analyze, manage, and negotiate documents, such as the document 120. In some embodiments, users 130A-B may upload the document 120 into the document management system 110 by capturing an image of the document 125. The document management system 110 can be a server, server group or cluster (including remote servers), or another suitable computing device or system of devices. In some implementations, the document management system 110 can communicate with client devices 140A-B over the network 150 to receive instructions and send documents (or other information) for viewing on client devices 140A-B. The document management system 110 can assign varying permissions to individual users 130A-B or groups of users controlling which documents each user can interact with and what level of control the user has over the documents they have access to. The document management system 110 will be discussed in further detail with respect to FIG. 2.

Users 130A-B of the client devices 140A-B can perform actions relating to documents stored within the document management system 110. Each client device 140A-B is a computing device capable of transmitting and/or receiving data over the network 150. Each client device 140A-B may be, for example, a smartphone with an operating system such as ANDROID® or APPLE® IOS®, a tablet computer, laptop computer, desktop computer, or any other type of network-enabled device from which secure documents may be accessed or otherwise interacted with. The client devices 140A-B each includes a camera application through which the users 130A-B can capture photographs of documents.

In some embodiments, the client devices 140A-B include an application through which the users 130A-B access the document management system 110. The application may be a stand-alone application downloaded by the client devices 140A-B from the document management system 110. Alternatively, the application may be accessed by way of a browser installed on the client devices 140A-B and instantiated from the document management system 110. The client devices 140A-B enables the users 130A-B to communicate with the document management system 110. For example, the client devices 140A-B enables the users 130A-B to access, review, execute, and/or analyze documents within the document management system 110 via a user interface. In the example herein, the users 130A-B upload one or more images of documents, such as the image of the document 125, to the document management system 110 using the client devices 140A-B. In some implementations, the users 130A-B can also include AIs, bots, scripts, or other automated processes set up to interact with the document management system 110 in some way. According to some embodiments, the users 130A-B are associated with permissions definitions defining actions users 130A-B can take within the document management system 110, or on documents, templates, permissions associated with other users and/or workflows.

The network 150 transmits data within the system environment 100. The network 150 may be a local area or wide area network using wireless or wired communication systems, such as the Internet. In some embodiments, the network 150 transmits data over a single connection (e.g., a data component of a cellular signal, or Wi-Fi, among others), or over multiple connections. The network 150 may include encryption capabilities to ensure the security of customer data. For example, encryption technologies may include secure sockets layers (SSL), transport layer security (TLS), virtual private networks (VPNs), and Internet Protocol security (IPsec), among others.

Figure 2:
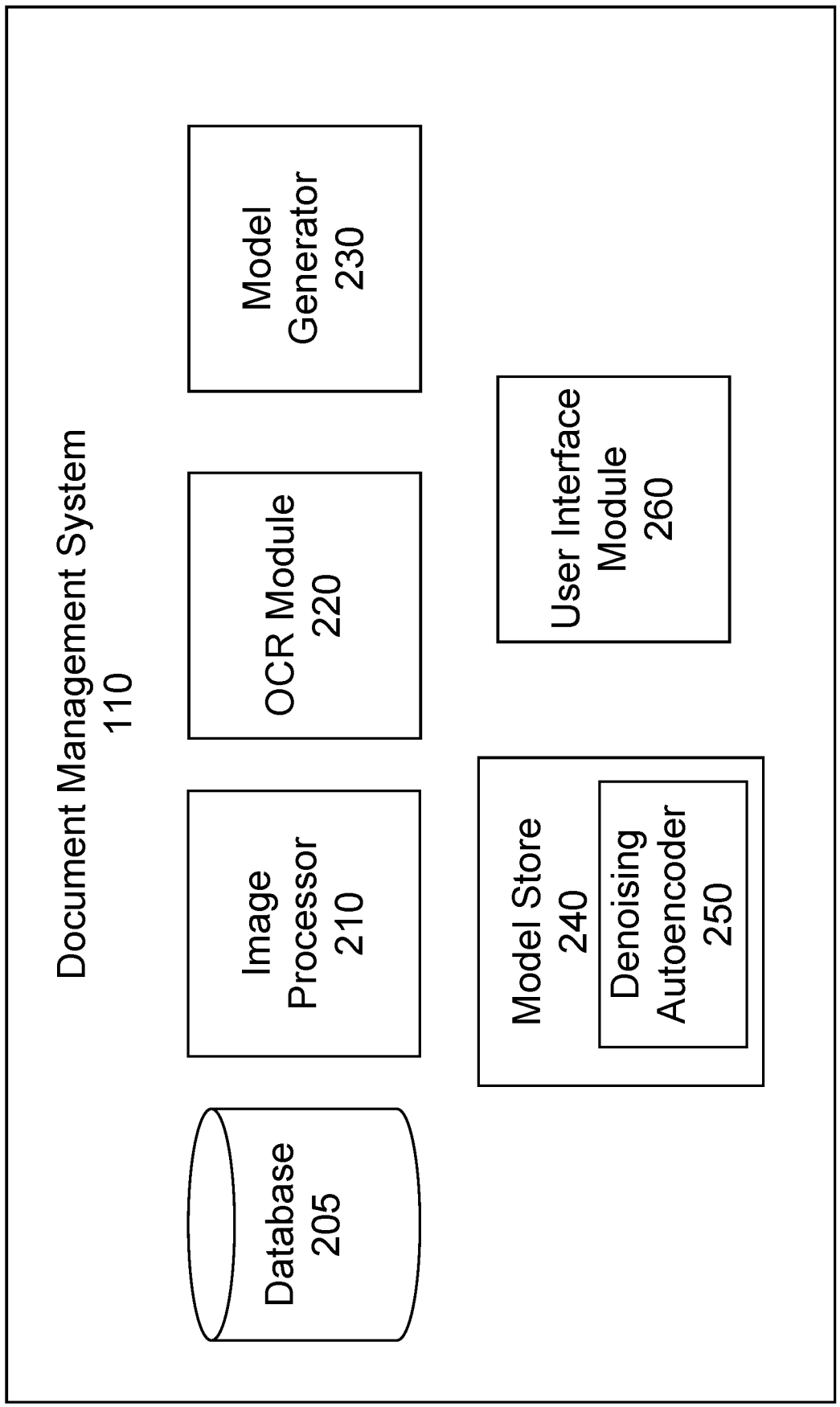
FIG. 2 is a high-level block diagram of a system architecture of the document management system, in accordance with an example embodiment.

FIG. 2 is a high-level block diagram of a system architecture of the document management system 110, in accordance with an example embodiment. The document management system 110 includes a database 205, an image processor 210, an OCR module 220, a model generator 230, a model store 240 which includes a denoising autoencoder 250, and a user interface module 260. Computer components such as web servers, network interfaces, security functions, load balancers, failover servers, management and network operations consoles, and the like may not be shown so as to not obscure the details of the system architecture. The document management system 110 may contain more, fewer, or different components than those shown in FIG. 2 and the functionality of the components as described herein may be distributed differently from the description herein.

The database 205 stores information relevant to the document management system 110. The database 205 can be implemented on a computing system local to the document management system 110, remote or cloud-based, or using any other suitable hardware or software implementation. The data stored by the database 205 may include, but is not limited to, the document 120, the image of the document 125, text corresponding to the document 120, training documents, images of the training documents, information about users (e.g., the users 130A-B), client device identifiers (e.g., of the client devices 140A-B), and other information stored by the document management system 110. The document management system 110 can update information stored in database 205 as new information is received, such as updates to the machine-learned models stored in the model store 240, new documents, and images of the new documents.

The image processor 210 processes images of documents. The image processor 210 uses image processing techniques to generate a high resolution version and a low resolution version of the image of the document 125. The high resolution version of the image presents readable text. In some embodiments, the image of the document 125 captured by the user is the high resolution version. The low resolution version presents text that is difficult to read or decipher due to noise and artifacts that affect image quality. For example, the low resolution version of the image may include contrast errors, blurry text, salt and pepper noise, speckle noise, gaussian noise, blotches, coffee stains, folding marks, scan noise, or copy machine noise, and so on.

The optical character recognition (OCR) module 220 performs OCR on images of documents. The OCR module 220 may use Tesseract, for example, or other OCR algorithms to extract text from images of documents. The extracted text can be edited by a user and/or processed by other natural language processing algorithms in the document management system 110.

The model generator 230 trains machine-learned models, including the denoising autoencoder 250, using training data stored in the database 205. The model generator 230 trains the denoising autoencoder 250 using images of historical documents stored in the database 205; the training data may be unlabeled. The denoising autoencoder 250 takes in a low resolution image of a document and outputs a denoised version of the image, also resulting in an OCR loss function that measures the model's performance. The model generator 230 back propagates and retrains the denoising autoencoder 250 using the OCR loss function. In some embodiments, the model generator 230 retrains the denoising autoencoder 250 with new images of documents.

The model generator 230 trains machine-learned models in addition to the denoising autoencoder 250 in other embodiments. The model generator 230 may use different versions of supervised or unsupervised machine learning, or another training technique to generate and update machine learned models. In some embodiments, other training techniques may be linear support vector machines (linear SVM), boosting for other algorithms (e.g., AdaBoost), neural networks, logistic regression, naïve Bayes, memory based learning, random forests, bagged trees, decision trees, boosted trees, boosted stumps, and so on.

The model store 240 stores machine learned models for the document management system 110, including those generated by the model generator 230. In some embodiments, the model store 230 may store various versions of models as they are updated over time. In other embodiments, the model store 230 may store multiple versions of a type of model to apply to different document types or to other variations of available inputs.

The model store 240 stores the denoising autoencoder 250. The denoising autoencoder 250 is a convolutional neural network configured to denoise images of documents. In other embodiments, the denoising autoencoder 250 is a variational or GAN (basic, cycle, deep convolutional, least square) autoencoder. The denoising autoencoder 250 takes in an image of the document, removes noise and artifacts that affect the readability and clarity of text within the document, and outputs a denoised image of the document. The denoised image preserves details of textual content in the document, improving the performance of subsequent machine learning algorithms that take, as input, the text of the document. For example, the denoised image output by the denoising autoencoder 250 enables subsequent OCR processes to extract text more accurately from the document.

The user interface module 260 generates user interfaces for users (e.g., the users 130A-B) to interact with the document management system 110. The user imports the image of the document 125 into the document management system 110 through a user interface generated by the user interface module 260. The user interface module 260 also provides a user interface for users to add, delete, or modify the contents of the document 120 once its text has been extracted by the document management system 110.

Denoising Autoencoder in the Document Management System

Figure 3:
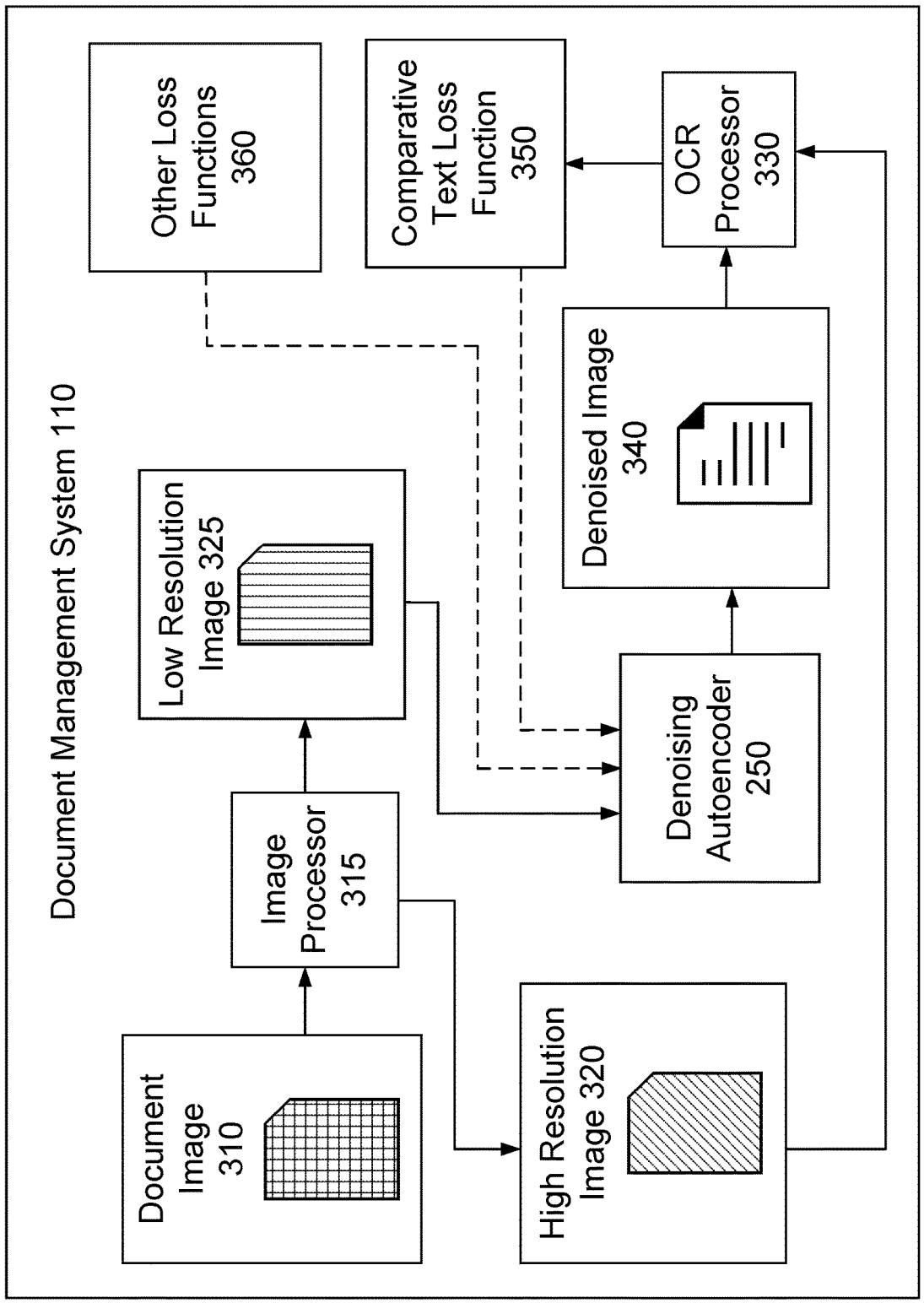
FIG. 3 illustrates training a machine-learned model configured to denoise an image of a document, in accordance with an example embodiment.

FIG. 3 illustrates training the machine-learned model configured to denoise the image of the document 125, in accordance with an example embodiment. As discussed with respect to FIG. 2, the machine-learned model is the denoising autoencoder 250. The denoising autoencoder 250 takes in a low resolution image of a document and outputs a denoised image of the document. The denoising autoencoder 250 is periodically retrained using loss functions that are back propagated through the model.

Within the document management system 110, an image processor 315 processes a document image 310 (e.g., the image of the document 125) to produce a high resolution version of the document image 320 and a low resolution version of document image 325. The low resolution version 325 includes noise and artifacts such that text within the document is difficult to read and process. The document management system 110 performs OCR 330 on the high resolution version 320 and extracts a first set of text representing the text within the document that has been captured in the document image 310. The document management system 110 provides, as input, the low resolution version 325 into the denoising autoencoder 250. The denoising autoencoder 250 removes the noise and artifacts, and outputs a denoised image of the document 340, which is of a higher resolution than the low resolution version 325. The denoised image 340 preserves the textual content within the document image 310. The document management system 110 performs OCR 330 on the denoised document 340, obtaining a second set of text that corresponds to the text of the document. The document management system 110 generates a comparative text loss function 350 (e.g., an OCR loss function) that compares the first set of text and the second set of text; the comparison includes a letter to letter, word to word, and sentence to sentence comparison of each of the sets of text. For example, the comparative text loss function 350 identifies differences in the two sets of text, including text in the first set of text that is not present in the second set of text (e.g., text that was lost due to the noise in the low resolution image of the document 325). Accordingly, the comparative text loss function 350 serves as a measure of the performance of the denoising autoencoder 250. A minimized comparative text loss function 350 represents a high performing denoising autoencoder 250.

The document management system 110 also uses various other loss functions 360 to measure the performance of the denoising autoencoder 250. For example, a mean-squared error loss function compares pixel quality in the high resolution image of the document 320 to pixel quality in the denoised image of the document 340. Other measures of the denoising autoencoder 250's performance include a Kullback-Liebler divergence loss function, a cross-entropy loss function, a vgg loss function, a minimax loss function, and a Wasserstein loss function.

The document management system 110 generates a feature vector that is used to retrain the denoising autoencoder 250. The feature vector includes the comparison of the first and second sets of text, thus back propagating the comparative text loss function 350 to improve the performance of the denoising autoencoder 250. In some embodiments, the feature vector includes entries based on the other loss functions 360 as well.

After being retrained using the comparative text loss function 350, the denoising autoencoder 250 is configured to better process low resolution images of documents such that the resulting denoised image of the document 340 accurately preserves text from the original document. Specifically, the denoised image of the document 340 accurately captures and denoises the pixels surrounding every letter, word, and sentence in the original document.

Figure 4:
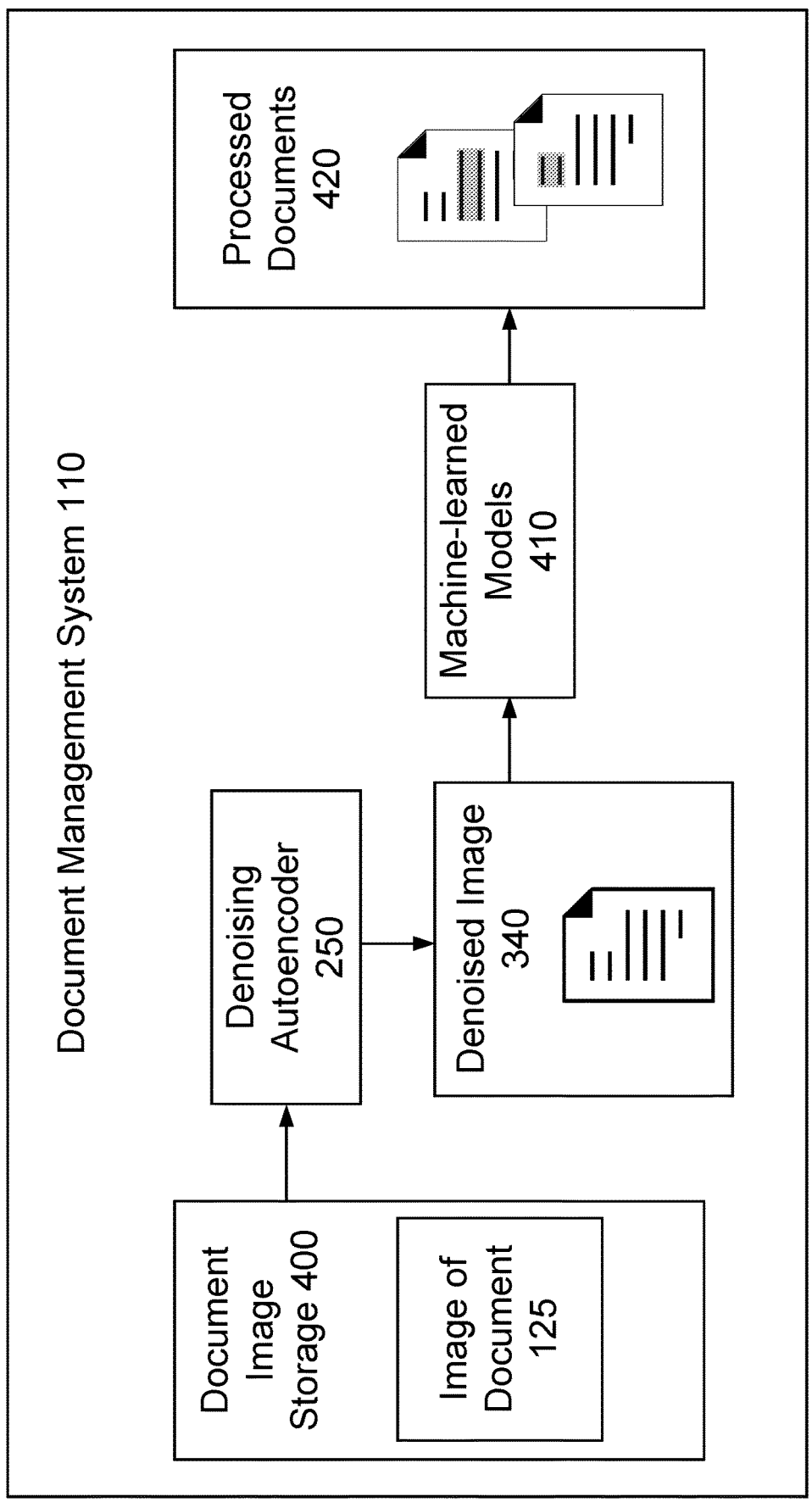
FIG. 4 illustrates an example application of the machine-learned model within the document management system, in accordance with an example embodiment.

Example Application of the Denoising Autoencoder in the Document Management System FIG. 4 illustrates an example application of the machine-learned model—the denoising autoencoder 250—within the document management system 110, in accordance with an example embodiment. The document management system 110 stores images of documents, including the image of the document 125, in a document image store 400. The document image store 400 is located within the database 205. The document management system 110 provides the image of the document 125 to the denoising autoencoder 250, which outputs the denoised image of the document 340. As described with respect to FIG. 2-3, the denoising autoencoder 250 removes noise and artifacts that impede the clarity and legibility of text in the image of the document 125 and outputs the denoised image of the document 340. The denoised image of the document 340 preserves the textual content of the document, which can then be accurately processed by other machine-learned models 410. The machine-learned models 410 include an algorithm configured to perform OCR on the denoised image of the document 340, resulting in the accurate extraction of document text. Other machine-learned models 410 use the extracted document text to generate predictive text for contracts, analyze documents for risk, automate document review processes based on document content, and so on. The document management system 110 generates processed documents 420 after applying the denoising autoencoder 250 and the machine-learned models 410 to the image of the document 125.

Process for Improving Optical Character Recognition

Figure 5:
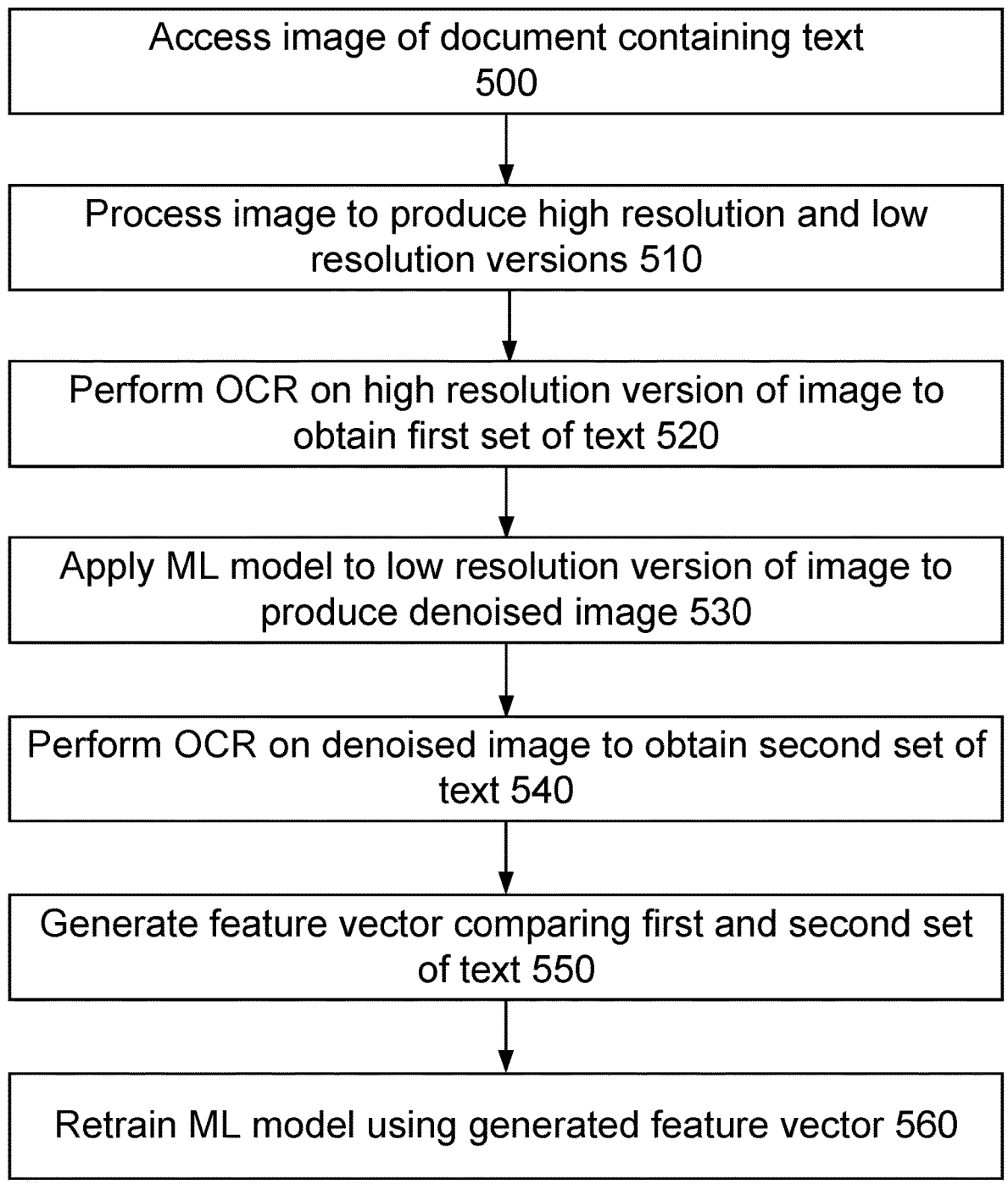
FIG. 5 illustrates an example process for improving optical character recognition in the document management system, in accordance with an example embodiment.

FIG. 5 illustrates an example process for improving optical character recognition in the document management system, in accordance with an example embodiment. The document management system (e.g., the document management system 110) accesses 500 an image of a document containing text (e.g., the image of the document 125). The image may be manually uploaded by a user (e.g., one of the users 130A-B), or accessed from a number of images of documents (e.g., stored in the document image store 400).

The document management system processes 510 the image to produce a high resolution version of the image (e.g., the high resolution image of the document 320) and a low resolution version of the image (e.g., the low resolution image of the document 325).

The document management system performs 520 optical character recognition (OCR) (e.g., via the OCR processor 330) on the high resolution version of the image, obtaining a first set of text that represents the text in the document.

The document management system applies 530 a machine-learned model (e.g., the denoising autoencoder 250) to the low resolution version of the image, producing a denoised image of the document (e.g., the denoised image 340).

The document management system performs 540 OCR on the denoised image of the document, obtaining a second set of text that represents the text in the document.

The document management system generates 550 a feature vector with entries that represent the performance of the machine-learned model. At least one of the entries of the feature vector is based on an OCR loss function (e.g., the comparative text loss function 350) that compares the first set of text and the second set of text. In some embodiments, the OCR loss function compares letters, words, and sentences of the first set of text to letters, words, and sentences of the second set of text, respectively.

The document management system retrains 560 the machine-learned model using the generated feature vector. The OCR loss function is accordingly back propagated, improving the performance of the model. The output of the improved machine-learned model is provided as input into subsequent machine-learned algorithms, such as OCR and other natural language processors.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    accessing an image of a document comprising text;
    processing the accessed image of the document to produce a first image version at a first resolution and to produce a second image version at a second resolution lower than the first resolution;
    performing optical character recognition on the first image version to obtain a first set of text representative of the text of the document;
    applying a machine-learned model to the second image version, the machine-learned model configured to produce a denoised image of the document at a third resolution, the third resolution higher than the second resolution;
    performing optical character recognition on the denoised image of the document to obtain a second set of text representative of the text of the document;
    generating a feature vector comprising entries each representative of a performance of the machine-learned model, at least one feature vector entry based on a comparison of the first set of text and the second set of text; and
    retraining the machine-learned model using the generated feature vector.

2. The method of claim 1, wherein the comparison of the first set of text and the second set of text comprises a comparison of letters, words, or sentences in each of the sets of text.

3. The method of claim 1, wherein the retrained machine-learned model is configured to identify text in the first set of text that is missing in the second set of text.

4. The method of claim 1, wherein the generated feature vector comprises at least one feature vector entry based on a mean-squared error loss function, a divergence loss function, a cross-entropy loss function, or a VGG loss function.

5. The method of claim 4, wherein the mean-squared error loss function is based on a comparison between pixels of the first image version of the document and the denoised image of the document.

6. The method of claim 1, wherein the machine-learned model is a convolutional neural network.

7. The method of claim 1, wherein the machine-learned model is periodically retrained using subsequently accessed images of documents.

8. Non-Transitory computer-readable storage media storing executable instructions that, when executed, cause one or more processors to:
    access an image of a document comprising text;
    process the accessed image of the document to produce a first image version at a first resolution and to produce a second image version at a second resolution lower than the first resolution;
    perform optical character recognition on the first image version to obtain a first set of text representative of the text of the document;
    apply a machine-learned model to the second image version, the machine-learned model configured to produce a denoised image of the document at a third resolution, the third resolution higher than the second resolution;
    perform optical character recognition on the denoised image of the document to obtain a second set of text representative of the text of the document;
    generate a feature vector comprising entries each representative of a performance of the machine-learned model, at least one feature vector entry based on a comparison of the first set of text and the second set of text; and
    retrain the machine-learned model using the generated feature vector.

9. The non-transitory computer-readable storage media of claim 8, wherein the comparison of the first set of text and the second set of text comprises a comparison of letters, words, or sentences in each of the sets of text.

10. The non-transitory computer-readable storage media of claim 8, wherein the retrained machine-learned model is configured to identify text in the first set of text that is missing in the second set of text.

11. The non-transitory computer-readable storage media of claim 8, wherein the generated feature vector comprises at least one feature vector entry based on a mean-squared error loss function, a divergence loss function, a cross-entropy loss function, or a VGG loss function.

12. The non-transitory computer-readable storage media of claim 11, wherein the mean-squared error loss function is based on a comparison between pixels of the first image version of the document and the denoised image of the document.

13. The non-transitory computer-readable storage media of claim 8, wherein the machine-learned model is a convolutional neural network.

14. The non-transitory computer-readable storage media of claim 8, wherein the machine-learned model is periodically retrained using subsequently accessed images of documents.

15. A document management system comprising:
one or more processors; and
non-transitory computer-readable storage media storing executable instructions that, when executed, cause the one or more processors to:
access an image of a document comprising text;
process the accessed image of the document to produce a first image version at a first resolution and to produce a second image version at a second resolution lower than the first resolution;
perform optical character recognition on the first image version to obtain a first set of text representative of the text of the document;
apply a machine-learned model to the second image version, the machine-learned model configured to produce a denoised image of the document at a third resolution, the third resolution higher than the second resolution;
perform optical character recognition on the denoised image of the document to obtain a second set of text representative of the text of the document;
generate a feature vector comprising entries each representative of a performance of the machine-learned model, at least one feature vector entry based on a comparison of the first set of text and the second set of text; and
retrain the machine-learned model using the generated feature vector.

16. The document management system of claim 15, wherein the comparison of the first set of text and the second set of text comprises a comparison of letters, words, or sentences in each of the sets of text.

17. The document management system of claim 15, wherein the retrained machine-learned model is configured to identify text in the first set of text that is missing in the second set of text.

18. The document management system of claim 15, wherein the generated feature vector comprises at least one feature vector entry based on a mean-squared error loss function, a divergence loss function, a cross-entropy loss function, or a VGG loss function.

19. The document management system of claim 18, wherein the mean-squared error loss function is based on a comparison between pixels of the first image version of the document and the denoised image of the document.

20. The document management system of claim 15, wherein the machine-learned model is a convolutional neural network.

* * * * *